US012448268B1

(12) United States Patent
Hoof

(10) Patent No.: US 12,448,268 B1
(45) Date of Patent: Oct. 21, 2025

(54) BOTTLE DRYING APPARATUS

(71) Applicant: Jordan Hoof, Scottsdale, AZ (US)

(72) Inventor: Jordan Hoof, Scottsdale, AZ (US)

( * ) Notice: Subject to any disclaimer, the term of this patent is extended or adjusted under 35 U.S.C. 154(b) by 0 days.

(21) Appl. No.: 18/809,321

(22) Filed: Aug. 19, 2024

(51) Int. Cl.

| | |
|---|---|
| ***A47L 19/04*** | (2006.01) |
| ***A47B 73/00*** | (2006.01) |
| ***A47F 7/28*** | (2006.01) |
| ***B67C 9/00*** | (2006.01) |
| *A47G 23/02* | (2006.01) |

(52) U.S. Cl.
CPC ............ *A47L 19/04* (2013.01); *A47B 73/006* (2013.01); *A47F 7/28* (2013.01); *B67C 9/00* (2013.01); *A47B 73/00* (2013.01); *A47F 7/281* (2013.01); *A47F 7/283* (2013.01); *A47G 23/02* (2013.01)

(58) Field of Classification Search
CPC .. A47L 19/04; A47F 7/28; A47F 7/281; A47F 7/283; B67C 9/00; A47B 73/008; A47B 73/006; A47B 73/00; A47B 73/004; A47G 23/0208; A47G 23/02; A47G 23/0266
See application file for complete search history.

(56) References Cited

U.S. PATENT DOCUMENTS 2,305,965 A * 12/1942 Henkel .................. A47G 23/02 211/75
3,606,023 A * 9/1971 Edmunds ............. A47B 73/006 211/74
3,870,155 A * 3/1975 Galloway ............ A47B 73/006 211/74
3,955,681 A * 5/1976 DeZinno ............ A47B 87/0223 206/821
4,637,580 A * 1/1987 Idstein .................... A47J 47/16 248/220.21
4,785,943 A * 11/1988 Deffner ..................... A47F 1/12 211/128.1
4,798,063 A * 1/1989 Rimmer .................... F25D 3/08 62/457.4
4,971,209 A * 11/1990 Todd ...................... A47B 73/00 211/74
D322,887 S * 1/1992 Kraker ......................... D12/420
D323,766 S * 2/1992 Robbins .......................... D7/590
5,259,580 A * 11/1993 Anderson .............. B60N 3/102 297/188.17
D353,082 S * 12/1994 Keven .......................... D12/420
D424,892 S * 5/2000 Ribet ............................. D7/701
(Continued)

*Primary Examiner* — Devin K Barnett

(57) ABSTRACT

A facility for storing bottles includes a base retainer, at least one auxiliary retainer, and one or more struts. The base retainer has an upward-facing cavity and the auxiliary retainers may include downward-facing and upward-facing cavities so that the base and one or more auxiliary retainers may be stacked upon struts received within these cavities. The retainers include spaced apart bottle-receiving bays for receiving bottles for draining. The bays include drain lumina communicating with the retainer cavities and the base retainer may also include a drain which receives a drain tube for plumbing drained fluids from the bottles to a nearby sink basin or utility drain. The struts are preferably hollow to allow fluids collected by the auxiliary retainers to collect and flow out by the drain tube. Each bay includes a flange-receiving slot complementary with flanges on bottles for holding bottles inverted for draining.

18 Claims, 6 Drawing Sheets

(56) References Cited

U.S. PATENT DOCUMENTS

| | | | | | |
|---|---|---|---|---|---|
| 6,290,074 | B1 * | 9/2001 | Syvuk | A47F 7/283 | D7/619.1 |
| 7,185,770 | B1 * | 3/2007 | Roten | A47B 81/00 | 211/70.6 |
| 7,328,876 | B2 * | 2/2008 | Jones | B60N 3/107 | 220/694.1 |
| D594,294 | S * | 6/2009 | Hamblin | D7/707 | |
| 8,714,373 | B2 * | 5/2014 | Danehy | A47F 3/14 | 211/49.1 |
| D824,736 | S * | 8/2018 | Yang | D7/707 | |
| D988,094 | S * | 6/2023 | Morris | D7/701 | |
| D990,996 | S * | 7/2023 | Zhong | D7/701 | |
| D991,753 | S * | 7/2023 | Morris | D7/701 | |
| D1,006,565 | S * | 12/2023 | Tong | D7/708 | |
| D1,024,701 | S * | 4/2024 | Chen | D7/701 | |
| 12,035,822 | B1 * | 7/2024 | Reno | A47F 5/0838 | |
| D1,045,464 | S * | 10/2024 | Cheng | D6/675.1 | |
| D1,045,530 | S * | 10/2024 | Morris | D12/419 | |
| D1,049,801 | S * | 11/2024 | Wu | D7/701 | |
| 2004/0084387 | A1 * | 5/2004 | Chang | B42F 7/12 | 211/11 |
| 2005/0161414 | A1 * | 7/2005 | Wescott, III | B01L 9/06 | 211/74 |
| 2006/0054575 | A1 * | 3/2006 | Robertson | A47F 3/0486 | 211/75 |
| 2008/0283481 | A1 * | 11/2008 | Evans | A47B 73/006 | 211/74 |
| 2009/0120886 | A1 * | 5/2009 | Weiss | A47B 53/02 | 211/74 |
| 2022/0079354 | A1 * | 3/2022 | Howard | A47J 47/16 | |

* cited by examiner

A–A

B–B

C–C

C–C

C–C

A–A

BOTTLE DRYING APPARATUS

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The invention relates modular storage systems for holding bottles, and especially those configured for retaining bottles in an inverted position for drying.

BACKGROUND

Many industries repetitively use sets of similar-sized bottles for various processes which require purging of their contents so that the bottles become available in a clean and dry state ready to use. Storing bottles in an inverted position reduces the waiting time required for rinsing liquid to evaporate completely.

Emptying bottles over a sink is a tedious and time-consuming task which also carries risk of dropping a wet bottle which may break if made of glass, triggering a second-order cleanup task. Some processes define a bottle dropped onto the floor a breach of sanitary practices requiring a re-wash; this repeated task represents a process waste of time, water, and cleansers.

Thus there is a broad interest and market need in many sorts of industries and businesses for apparatus which affords compact temporary yet ready storage of bottles and facilitates the collecting and disposing of rinsing fluid drained from the bottles; from restaurants and bars where bottles are recycled, to laboratories handling liquid specimens in bottles which must be thoroughly cleaned between uses to prevent contamination.

BRIEF DESCRIPTION

A primary objective of the invention is to provide a modular retaining system for holding bottles in an inverted position so that rinsing fluid from a previous washing or rinsing process is allowed to drain out of the bottles held in the system, allowing the bottles to dry out. The system then provides a supply of clean and dry bottles available for re-use in industrial or commercial purposes.

Another objective of the invention is to provide favorable means for collecting rinsing fluid leaving bottles freshly added to the system, and a corollary objective of the invention is to provide favorable means for diverting used rinsing fluid from the system to a sink, collection basin, or a utility drain so as to prevent used rinsing fluid from flowing to unwanted areas such as a counter top in the vicinity of the invention.

Yet another objective of the invention is to provide retention means in the storage facility and complementary retention features on the plurality of bottles to be used with the system. Yet another corollary objective of the invention is to provide that these complementary retention means are separable from the bottle and may be affixed to many different styles of existing bottles to make them available for use with the invention.

BRIEF DESCRIPTION OF THE DRAWINGS

A further understanding of the nature and advantages of various examples of particular embodiments may be realized by reference to the remaining portions of the specification and the drawings, in which like reference numerals are used to refer to similar components. When reference is made to a reference numeral without specification to an existing sub-label, it is intended to refer to all such multiple similar components.

DETAILED DESCRIPTION OF CERTAIN EMBODIMENTS

Figure 1:
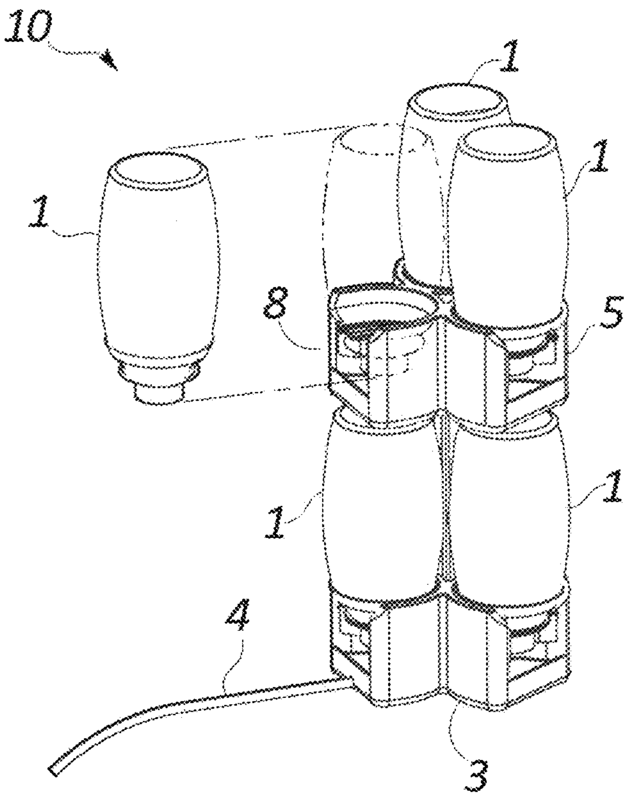
FIG. 1 shows an oblique view of an example of a preferred embodiment of a bottle storing facility in accordance with the invention.

While various aspects and features of examples of certain preferred embodiments have been summarized above, the following detailed description illustrates a few exemplary examples of embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described examples and embodiments. It will be apparent to one skilled in the art, however, that other embodiments of the present invention may be practiced without some of these specific details. Several examples of embodiments are described herein, and while various features are ascribed to different examples and/or embodiments, it should be appreciated that the features described with respect to one example or embodiment may be incorporated with other examples or embodiments as well. By the same token, however, no single feature or features of any described example or embodiment should be considered essential to every embodiment of the invention, as other embodiments and examples of embodiments of the invention may omit such features.

In this application the use of the singular includes the plural unless specifically stated otherwise, and use of the terms "and" and "or" is equivalent to "and/or," also referred to as "non-exclusive or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise. Where grammatical genders are concerned, a "user" of the invention may be of any gender regardless of any specific pronouns or grammar used in this specification. Thus, masculine grammatical forms may be interpreted to include and subsume feminine or any other grammatical genders.

The specification and claims also use the preposition "betwixt" to specify an entity, such as an object or a feature, specifically located between two other entities. The preposition "between" is less exact in that it may be used to specify events occurring during an interval of time, and it may also include broader meanings of "intermediate in quantity or degree." In this specification, the word "between" may be used more informally to include these and other broader meanings. Also in the specification and claims, the words "up," "above," "over," "upward," and "upper," and their complementary opposites "down," "below" or "beneath," "under," "downward," and "lower" shall derive their meanings from customary under-standings of relative positions, orientations, and direc-tions defined mostly by the direction of the local gravita-tional field where the invention is used or proposed or intended to be used.

In this specification the term "hydraulically connected" means that by piping, plumbing, hose, tubing, open channels or by pressurized or gravity induced flow, a first entity is connected to a second entity such that fluid may communicate with and flow between the first entity and the second entity.

The invention is facility or system for storing bottles that includes a base retainer, at least one auxiliary retainer, and one or more struts. The base retainer has an upward-facing cavity and the auxiliary retainers have downward-facing and upward-facing cavities so that the base and one or more auxiliary retainers may be stacked upon struts received within these cavities. The retainers include spaced apart of bottle-receiving bays for receiving bottles for draining. The bays may include drain lumina communicating to the retainer cavities and the base retainer may also include a drain which receives a drain tube for plumbing drained fluids from the bottles to a nearby sink basin or utility drain.

The struts are hollow to allow fluids collected by the auxiliary retainers to collect and flow out by the drain tube. Each bay includes a flange-receiving slot complementary with flanges on bottles for holding bottles inverted for draining. In this specification a "strut" is generally a lenticular structural member primarily intended to resist longitudinal compression. A strut may be of solid cross section or in preferable embodiments such as for conveying drained fluid from an upper, auxiliary retainer to a lower, primary or base retainer, a strut may be hollow or include an internal lumen. Some preferred struts are lenticular beams extruded with a substantially uniform or constant cross section except for end features adapted to secure an end of a strut to a retainer.

Referring now to the figures, FIG. 1 shows an oblique view of an example of a preferred embodiment of a bottle storing facility [10] in accordance with the invention. The invention is a rack system for storing bottles, comprising a base retainer [3] and a least one of a plurality of auxiliary retainers [5] that may be stacked above the base retainer. The retainers include an array or a series of bottle-receiving bays [8] which include features complementary to the features by the necks of the bottles being retained in the bays. The bottles [1] are preferably held in an inverted orientation for draining of rinsing or washing fluids. The retainers include features which collect fluids that run out of the bottles. Fluids collected by any of the one or more auxiliary retainers is directed to the base retainer. Fluid collected from bottles in the base retainer and from the auxiliary retainers is collected in the base retainer and directed to a drain tube [4.] The drain tube may be conveniently secured by clamps or similar hardware so that it may conduct all drained fluids to a sink basin or utility drain, thus allowing one or more instances of the invention to be installed on countertops or work benches not necessarily or conveniently proximate to a drain system within a building. Bottle washing and the hanging of bottles to dry may then take place in a wider area than without the benefit of the invention, so that businesses having processes that include rinsing and reuse of rinsed bottles may operate in more diverse sorts of working areas.

Figure 2:
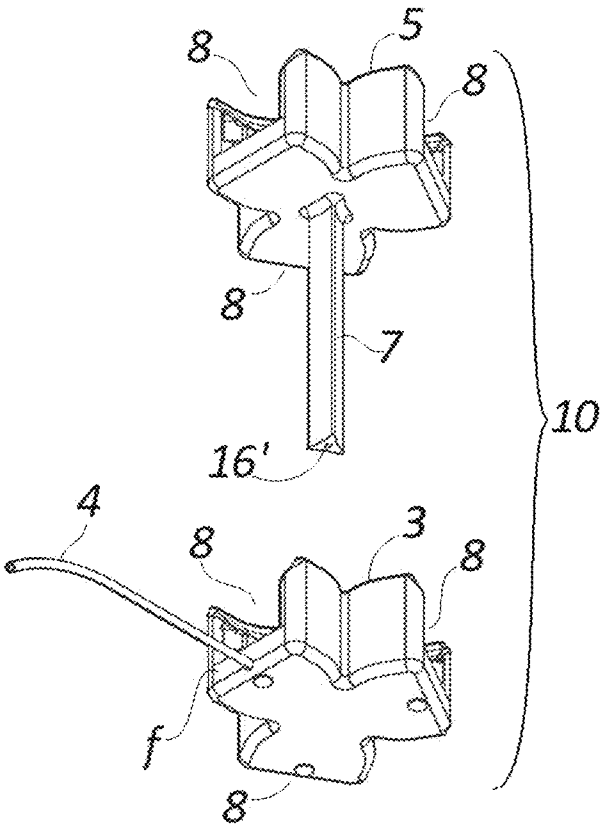
FIG. 2 shows an underside oblique, exploded view of components of the bottle storing facility of FIG. 1.

FIG. 2 shows an underside oblique, exploded view of components of the bottle storing facility [10] of FIG. 1. According to some examples of embodiments within the scope of the invention, the assembly comprises a base retainer [3,] and a least one of a plurality of auxiliary retainers [5,] with the base retainer comprising a spaced apart series of bottle-receiving bays [8,] and with each of the auxiliary retainers also comprising spaced apart series of bottle-receiving bays.

The auxiliary retainer includes at least one of a plurality of struts [7] that may be inserted into the base retainer for assembly into a multi-storey rack system. The strut may be integral to a base retainer or integral to an auxiliary retainer as shown. The strut includes a drain lumen [16'] for collecting rinsing fluid drained from bottles positioned in the bays of the one or more auxiliary retainers and directing this fluid into the base retainer.

The base retainer further comprises an exterior surface [f] and a primary drain lumen communicating between an upward-facing cavity of the base retainer (see FIG. 4*a*) and this exterior surface. The strut inserts into this upward-facing cavity so that fluids collected by the one or more auxiliary retainers in the assembled system may proceed through the strut to the drain tube [4.]

Figure 3:
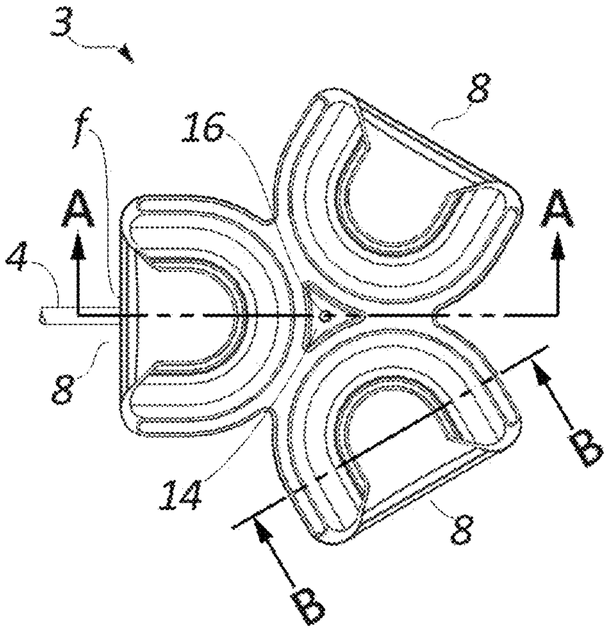
FIG. 3 shows a top view of the bottle storing facility of FIG. 1, and defines section line A-A for the cross section views of FIGS. 4*a*, 4*b*, and 7*a*, and defines section line B-B for the cross section view of FIG. 5.
Figure 4A:
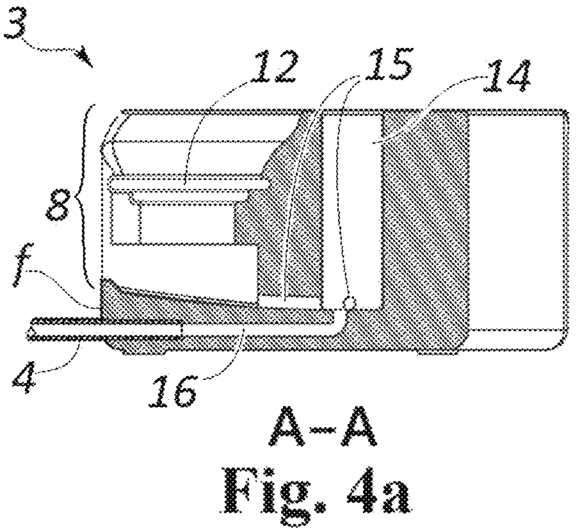
FIG. 4*a* shows a cross section view of an example of an embodiment of a base retainer in accordance with the invention, taken at section line A-A of FIG. 3.
Figure 4B:
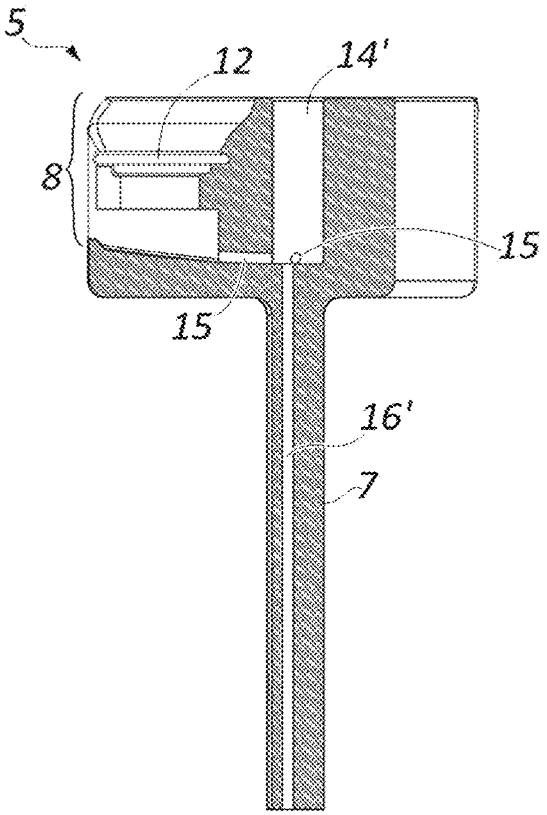
FIG. 4*b* shows a cross section view of an example of a preferred embodiment of an auxiliary retainer in accordance with the invention, taken at section line A-A of FIG. 3.
Figure 5:
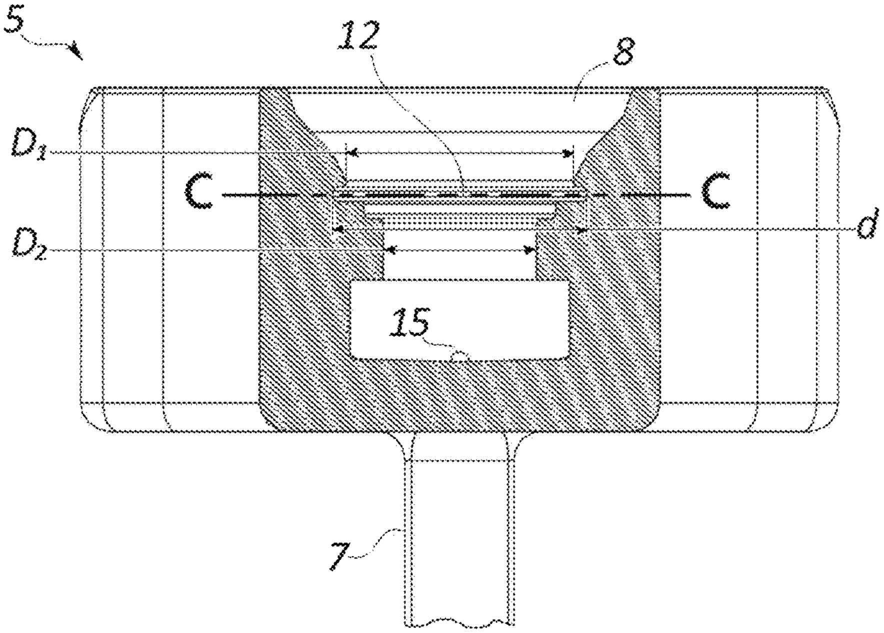
FIG. 5 shows a cross section view of the auxiliary retainer of FIG. 4*a* taken at section line B-B of FIG. 3, and defines section line C-C for the cross section views of FIGS. 6*a*, 6*b*, and 6*c*.
Figure 7A:
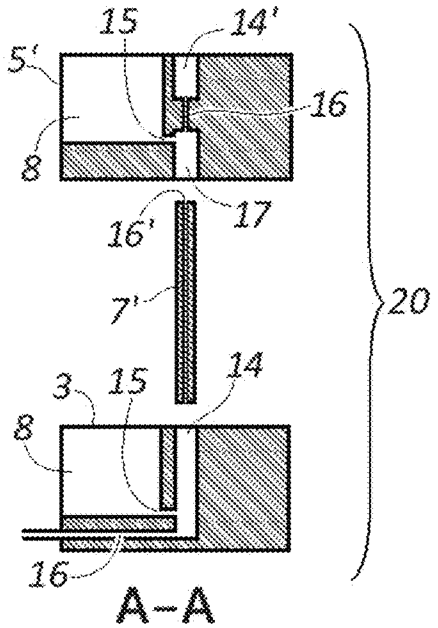
FIG. 7*a* shows a cross section view of an example of a preferred stackable alternative embodiment of a bottle storing facility in accordance with the invention, taken at section line A-A of FIG. 3.

FIG. 3 shows a top view of the bottle storing facility of FIG. 1, and defines section line A-A for the cross section views of FIGS. 4*a*, 4*b*, and 7*a*, and defines section line B-B for the cross section views of FIG. 5. In examples of preferable embodiments, a top view of a base retainer [3] would be identical to a top view of any of the auxiliary retainers stackable atop the base retainer. The base retainer includes an upward-facing cavity [14] with a primary drain lumen [16] that communicates with an exterior surface [f] of the base retainer. A drain tube [4] is inserted into the exit of the primary drain lumen.

Each bottle-receiving bay [8] further comprises a substantially semicircular cavity and is part of a spaced apart series of bottle-receiving bays. The bays may be arranged in a linear series or a radially spaced apart series as seen in this figure. In the example depicted, radially spaced apart series of bottle-receiving bays of the base retainer are arranged in a radial symmetry which is a three-fold symmetry. Similarly, bottle-receiving bays of a stackable series of one or more auxiliary retainers for use with the base as shown may also be arranged in a radial symmetry which is a three-fold symmetry.

FIG. 4*a* shows a cross section view of an example of a preferred embodiment of a base retainer [3] in accordance with the invention, taken at section line A-A of FIG. 3. The base retainer comprises an upward-facing cavity [14] and a primary drain lumen [16] communicating between the upward-facing cavity and an exterior surface [f.] The base retainer further comprises at least one secondary drain lumen [15] communicating between the upward-facing cavity and any bay from among the series of bottle-receiving bays [8.] The bottle-receiving bays include a receiving slot [12] adapted to receive a substantially complementary flange feature of a bottle proximate to the bottle neck. The bottle is received into the bay in an inverted position and the bottle flange fits into the flange-receiving slot.

In preferable configurations, all bays in a given base or auxiliary retainer are hydraulically connected by secondary drain lumina to a primary drain lumen for fluid leaving the retainer. A drain tube [4] inserted into the exit of the primary drain lumen of the base retainer may be plumbed into building utility drains or a sink basin near or far from the bottle draining apparatus.

FIG. 4*b* shows a cross section view of an example of a preferred embodiment of an auxiliary retainer [5] in accordance with the invention, taken at section line A-A of FIG. 3. In the example depicted, the auxiliary retainer includes a strut [7] portion extending downwardly. As seen in the previous figure, the base retainer has an upward-facing cavity [14 of FIG. 4*a*] into which the lower tip of this strut portion may be inserted to create stacked sets of bottle-receiving bays, which save countertop space. The auxiliary retainer preferably includes its own upward-facing cavity [14'] allowing multi-storey stacking in an assembly comprising one base retainer topped by more than one auxiliary retainer. In other examples and embodiments, to constrain the assembly to a two-storey system of one base and only one auxiliary retainer, this upward-facing cavity may be omitted or shaped so that the strut may not be received into the upward-facing cavity.

The strut portion further comprises a strut drain lumen [16'] communicating or hydraulically connected directly or indirectly to the bottle-receiving bays in the auxiliary retainer. In the example shown, a plurality of least one secondary drain lumen [15] communicates between the upward-facing cavity [14'] and all or any bay from among the series of bottle-receiving bays [8.] Fluid from drained bottles proceeds from the bays to the strut drain lumen, and when assembled to the base retainer, this fluid will leave the base retainer by its drain tube.

As with the base retainer, the bottle-receiving bays of an auxiliary retainer in accordance with the invention also include a receiving slot [12] adapted to receive a substantially complementary flange feature of a bottle proximate to the bottle neck. The bottle is received into the bay in an inverted position and the bottle flange fits into the flange-receiving slot.

Figure 6A:
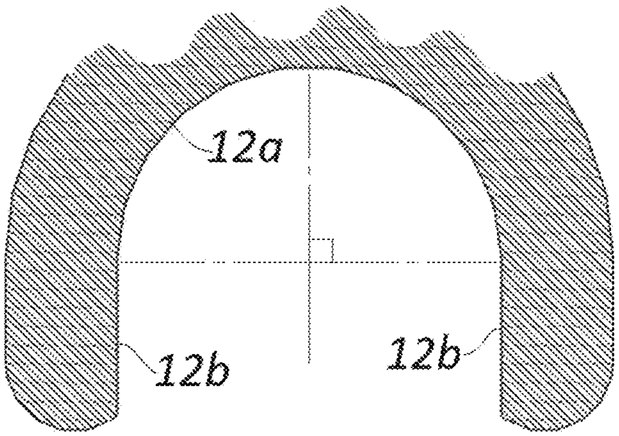
FIG. 6*a* shows a cross section view of an example of a preferred embodiment of a flange-receiving slot of a bottle-receiving bay in accordance with the invention as seen through section line C-C of FIG. 5.
Figure 6B:
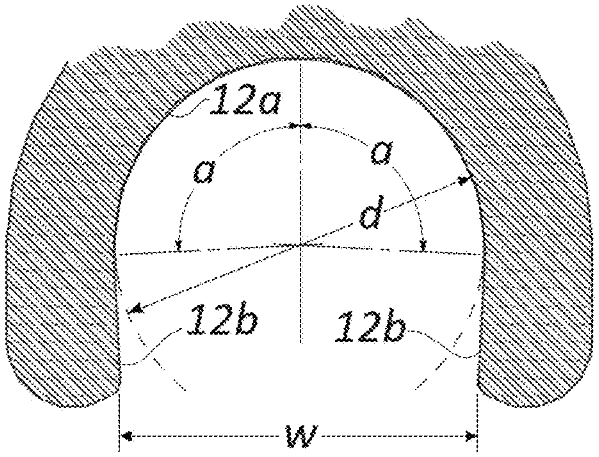
FIG. 6*b* shows a cross section view of an example of a preferred alternative embodiment of a flange-receiving slot of a bottle-receiving bay in accordance with the invention as seen through section line C-C of FIG. 5.
Figure 6C:
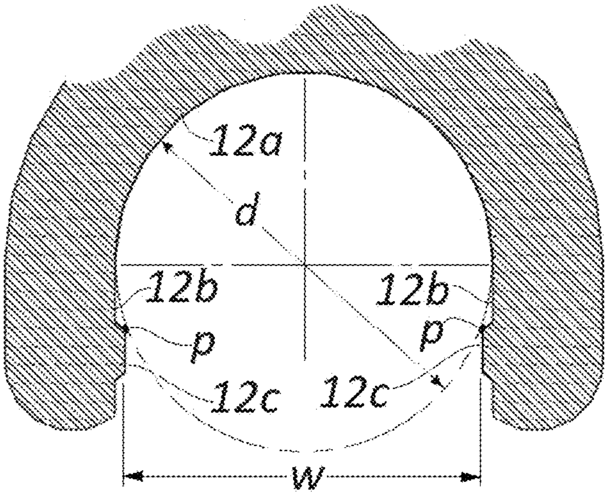
FIG. 6*c* shows a cross section view of an example of another preferred alternative embodiment of a flange-receiving slot of a bottle-receiving bay in accordance with the invention as seen through section line C-C of FIG. 5.

FIG. 5 shows a cross section view of the auxiliary retainer [5] of FIG. 4*a*, taken at section line B-B of FIG. 3, and defines section line C-C for the cross section views of FIGS. 6*a*, 6*b*, and 6*c*. Each bottle-receiving bay [8] further comprises a substantially semicircular cavity having a first portion of a first diameter [$D_1$,] a second portion of a second diameter [$D_2$] coaxial to and axially spaced apart from the first portion, and a flange-receiving slot [12] of diameter [d] betwixt the first and second portions.

FIG. 6*a* shows a cross section view of an example of a preferred embodiment of a flange-receiving slot of a bottle-receiving bay in accordance with the invention. In this figure and in FIGS. 12*b* and 12*c*, since the section line C-C in FIG. 5 does not include view direction arrows, no structures outside of the cutting plane are shown in these figures.

An example of a flange-receiving slot includes a contour having an arcuate middle portion [12*a*] betwixt first and second substantially straight end portions [12*b*.] In this example the straight sections of the contour of the slot are substantially parallel to each other. The slot is sized to receive a substantially complementary flange feature of a bottle proximate to the bottle neck. Preferably the bottle is received into the bay in an inverted position and the bottle flange fits into this flange-receiving slot.

FIG. 6*b* shows a cross section view of an example of a preferred alternative embodiment of a flange-receiving slot of a bottle-receiving bay in accordance with the invention as seen through section line C-C of FIG. 5. The arcuate middle section [12*a*] resides betwixt first and second substantially straight end portions [12*b*] of the contour. The arcuate middle portion of the slot defines a diameter [d] which is preferably sized closely to the diameter of the complementary flanges on bottles adapted for use with the invention. However, in this type of alternative example a portion of the first straight section and a portion of the second straight section define a width dimension [w] narrower than the diameter. If this portion of the bay is made of a compliant or flexible material, then inserting the flange past the constricted section will include a force fit which elapses once the bottle flange reaches its fully inserted position with the bottle flange in contact with, at least proximal to, or at least approximately concentric with the arcuate portion of the flange-receiving slot. The force fit, "squeeze," or "pinch" feel while the widest portion of the bottle flange slips past the narrowed section of the entry of the slot also acts as a retention feature which may be advantageous if the bottle hanging apparatus is used in an environment subject to vibrations. The retention effect would prevent the flanges of bottles retained in their bays from rattling their way out of the slot and falling free.

FIG. 6*c* shows a cross section view of an example of another alternative embodiment of a flange-receiving slot of a bottle-receiving bay in accordance with the invention as seen through section line C-C of FIG. 5. The arcuate section [12*a*] of the contour of the slot defines a diameter [d,] and the straight sections [12*b*] of the contour of the slot are substantially parallel to each other. In this type of alternative example, a portion of the first straight section and a portion of the second straight section define a width dimension [w] narrower than the diameter, however, the straight sections exclusive of the two opposed detent bumps [12*c*] do not interfere with the passage of a bottle flange.

In preferable configurations, points [p] of the two detent bumps proximal to the bottle flange, in concert with a point or edge contact of the flange to the arcuate portion of the slot contour cooperate to embrace and stabilize the bottle by its flange. As with the example seen in FIG. 6*b*, the force fit, “squeeze,” or “pinch” feel while the widest portion of the bottle flange slips past the detent bumps prevent the flanges of bottles retained in their bays from rattling their way out of the slot and falling free, which may be advantageous in environments subject to vibrations. For selected materials for the bay, the detent bumps may impart a “click in” feel and also a “click in” sound as the bottle flange passes to the interior of points [p.]

Some preferable materials for effective detent, squeeze, and pinch feels include polymers, epoxies, natural rubber compounds, and composite materials having a durometer between 30 Shore A and 80 Shore A inclusively, and/or between 35 Shore D and 85 Shore D inclusively. Some preferable materials include multi-jet fusion (MJF) materials which may comprise nylon (polyamides and usually aliphatic polyamides,) materials with or without glass fiber in a composite, polyethylenes such as high-density polyethylene (HDPE) and ultra-high molecular weight polyethylene (UHMW or UHMWPE,) acrylonitrile butadiene styrene (ABS,) polypropylene (PP,) urethane rubber, polyphenylene sulphone (PPS,) polyacrylonitrile, Delrin®, (otherwise known as acetal, polyoxymethylene or POM,) poly methyl methylacryilate (PMMA, sometimes knwn as “acrylic,” Plexiglass®, or Persipex®,) or polycarbonate, including a glass-filled polycarbonate.

FIG. 7*a* shows a cross section view of an preferred example of a stackable alternative embodiment of a bottle storing facility [20] in accordance with the invention, taken at section line A-A of FIG. 3. In this example, the base retainer [3] includes an upward-facing cavity [14] and an auxiliary retainer [5'] has a downward-facing cavity [17.]A strut [7'] has a first end receivable within the upward-facing cavity of the base retainer and its second end receivable within the downward-facing cavity of the auxiliary retainer. The strut includes a strut drain lumen [16'] extending between its first end and its second end. The auxiliary retainer has a primary drain lumen [16] communicating between its downward-facing cavity and an upward-facing cavity [14'.] Bottle-receiving bays [8] in the auxiliary retainer have secondary drain lumina [15] that connect, directly or indirectly, to the downward-facing cavity. Bottle-receiving bays [8] in the base retainer have secondary drain lumina [15] that connect to the upward-facing cavity. The upward-facing cavity includes a primary drain lumen [16] which in preferable examples may be connected to a drain tube.

A plurality of more than one auxiliary retainer may be assembled atop the base using a plurality of more than one strut to create a multi-storey assembly wherein the first from among the plurality of struts inserts its first end into the upward-facing cavity of the base retainer and its second end into the downward-facing cavity of the first from among a plurality of auxiliary retainers. Successive storeys are built up by interspersing additional struts inserted between additional auxiliary retainers.

Figure 7B:
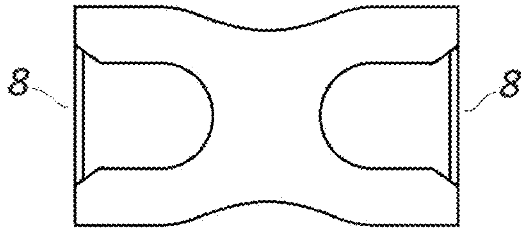
FIG. 7*b* shows a top view of an example of a preferred embodiment of a retainer in accordance with the invention in which the bottle-receiving bays are arranged in biradial symmetry.

FIG. 7*b* shows a top view of an example of a preferred embodiment of a retainer in accordance with the invention in which the bottle-receiving bays [8] are arranged in biradial symmetry. More specifically, the radially spaced apart series of bottle-receiving bays of the retainer as shown are arranged in a biradial symmetry. The retainer shown in this figure may be a base retainer or an auxiliary retainer.

Figure 7C:
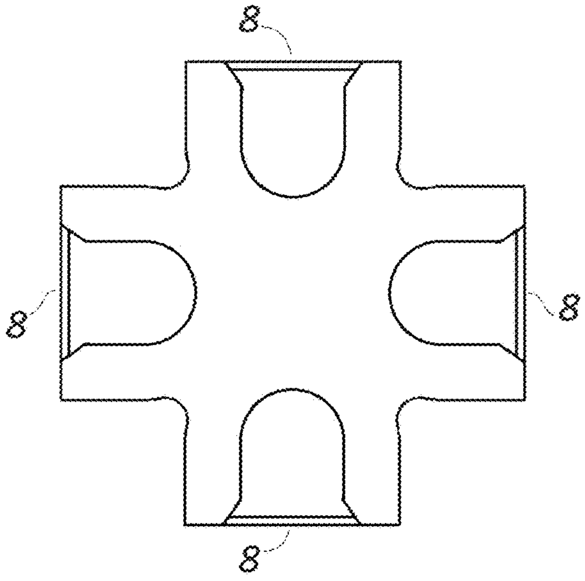
FIG. 7*c* shows a top view of an example of a preferred embodiment of a retainer in accordance with the invention in which the bottle-receiving bays are arranged in four-fold symmetry.

FIG. 7*c* shows a top view of an example of a preferred embodiment of a retainer in accordance with the invention in which the bottle-receiving bays [8] are arranged in four-fold symmetry. More specifically, the radially spaced apart series of bottle-receiving bays of the retainer as shown are arranged in four-fold symmetry. The retainer shown in this figure may be a base retainer or an auxiliary retainer.

Figure 7D:
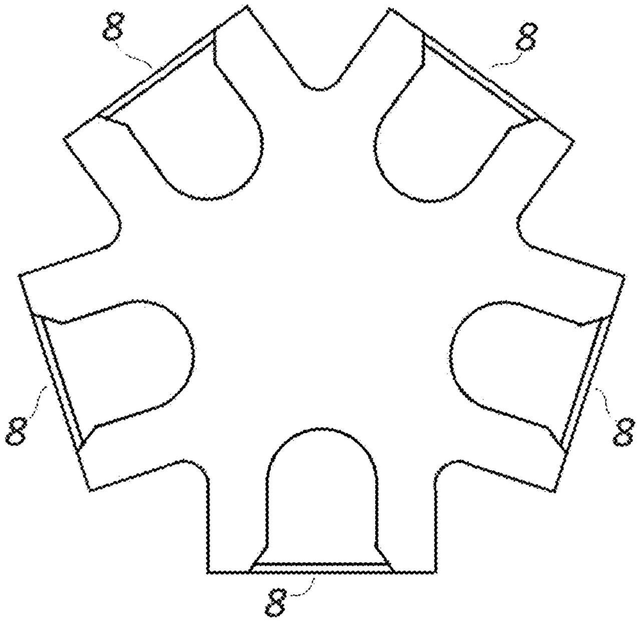
FIG. 7*d* shows a top view of an example of a preferred embodiment of a retainer in accordance with the invention in which the bottle-receiving bays are arranged in five-fold symmetry.

FIG. 7*d* shows a top view of an example of a preferred embodiment of a retainer in accordance with the invention in which the bottle-receiving bays [8] are arranged in five-fold symmetry. More specifically, the radially spaced apart series of bottle-receiving bays of the retainer as shown are arranged in five-fold symmetry. The retainer shown in this figure may be a base retainer or an auxiliary retainer.

Figure 7E:
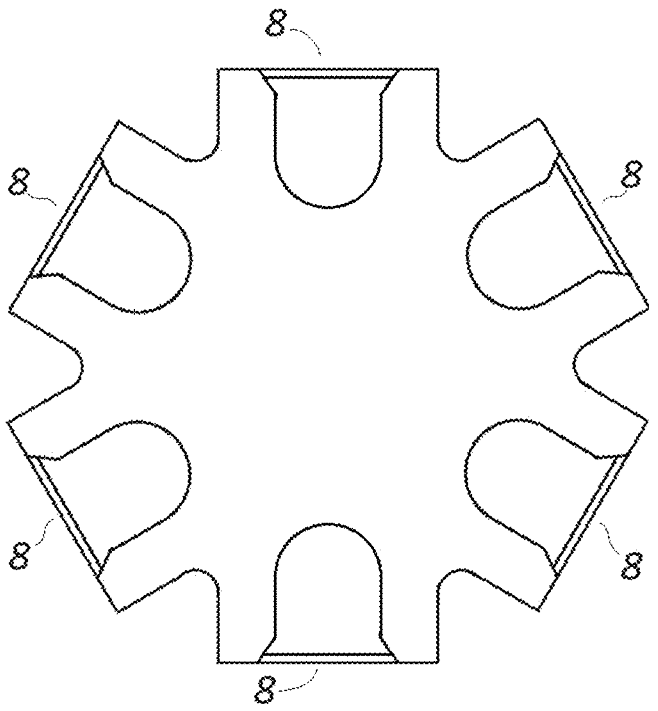
FIG. 7*e* shows a top view of an example of a preferred embodiment of a retainer in accordance with the invention in which the bottle-receiving bays are arranged in six-fold symmetry.

FIG. 7*e* shows a top view of an example of a preferred embodiment of a retainer in accordance with the invention in which the bottle-receiving bays [8] are arranged in six-fold symmetry. More specifically, the radially spaced apart series of bottle-receiving bays of the retainer as shown are arranged in six-fold symmetry. The retainer shown in this figure may be a base retainer or an auxiliary retainer. A review of FIGS. 3, 7*b*, 7*c*, 7*d*, and this figure will show that it is possible to contemplate exemplary retainers having arrays of more than six bays within the scope of the invention with preferable embodiments having between two and eight bays inclusively.

Figure 8:
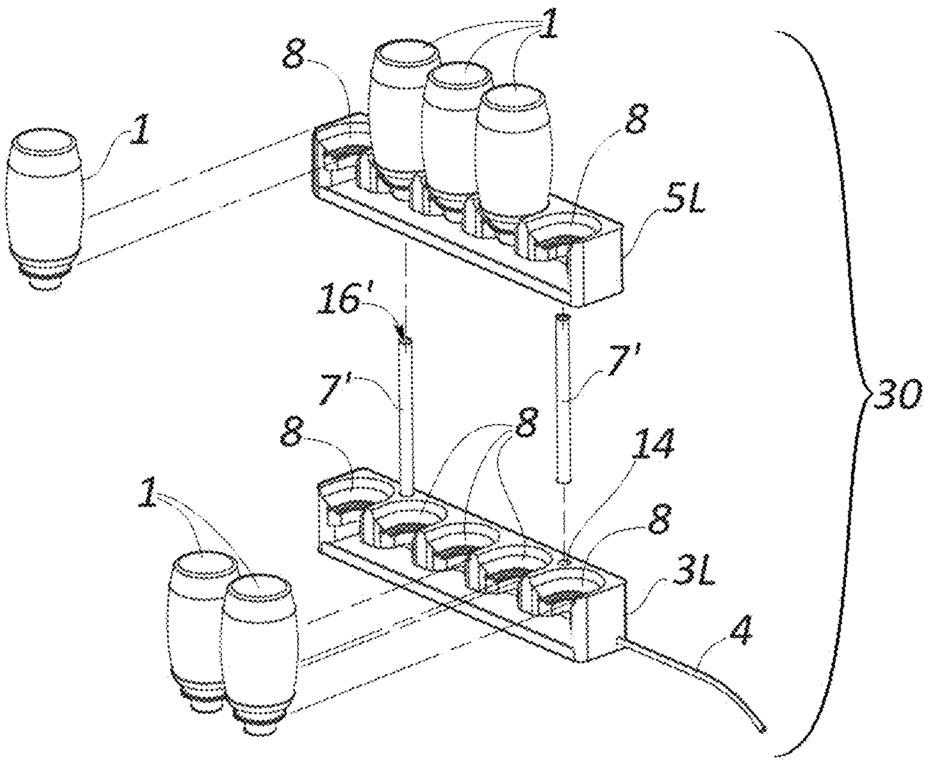
FIG. 8 shows an oblique, partially exploded view of an example of another preferred alternative embodiment within the scope of the invention wherein the series of bottle-receiving bays of the base retainer and the auxiliary retainer are arranged in linear rather than radial arrays.

FIG. 8 shows an oblique, partially exploded view of an example of another preferred alternative embodiment within the scope of the invention which is an assembly [30] wherein the series of bottle-receiving bays [8] of the base retainer [3L] and the auxiliary retainer [5L] are arranged in linear rather than radial arrays. The bottles [1] are preferably held in an inverted orientation for draining of rinsing or washing fluids. The retainers include features which collect fluids that run out of the bottles. Fluids collected by any of the one or more auxiliary retainers is directed to the base retainer.

In this example the base retainer may have one or more than one upward-facing cavity [14,] and the auxiliary retainer would have a corresponding series of downward-facing cavities, and the number of struts [7'] with their first ends received within an upward-facing cavity of the base retainer and with their seconds ends received within downward-facing cavities of a first from among the series of auxiliary retainers is at least two. As seen in previous figures, the plurality of bays in the auxiliary retainer are hydraulically connected to at least one of the downward-facing cavities of the auxiliary retainer, and the plurality of bays in the base retainer are hydraulically connected to at least one of its upward-facing cavities of the auxiliary retainer, and at least one of the struts interposed between the base and auxiliary retainers includes a strut drain lumen [16'.]

Fluid collected from bottles in the base retainer and from the auxiliary retainers may thus be directed to the base retainer and therein directed to a drain tube [4.] The drain tube may be conveniently secured by clamps or similar hardware so that it may conduct all drained fluids to a sink basin or a utility drain, thus allowing one or more instances of the invention to be installed on countertops or work benches not necessarily or conveniently proximate to a drain system within a building.

While certain features and aspects have been described with respect to various examples and exemplary embodiments, one skilled in the art will recognize that numerous modifications are possible. Also, while certain functionality is ascribed to certain system components, unless the context dictates otherwise, this functionality may be distributed among various other system components in accordance with the several examples and embodiments.

Moreover, while the procedures of the methods and processes described herein are described in a particular order for ease of description, unless the context dictates otherwise, various procedures may be reordered, added, and/or omitted in accordance with various examples and embodiments. Furthermore, the procedures described with respect to one method or process may be incorporated within other described methods or processes; likewise, system components described according to a particular structural configuration and/or with respect to one system may be organized in alternative structural configurations and/or incorporated within other described systems.

The present disclosure is not to be limited in terms of the particular examples and embodiments described in this application, which are intended as illustrations of various aspects. Many modifications and variations may be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

Hence, while various examples and embodiments are described with or without certain features for ease of description and to illustrate exemplary aspects of those examples and embodiments, the various components and/or features described herein with respect to a particular example or embodiment may be substituted, added, and/or subtracted from among other described examples or embodiments, unless the context dictates otherwise. Thus, unauthorized instances of apparatuses and methods claimed herein are to be considered infringing, no matter where in the world they are advertised, sold, offered for sale, used, possessed, or performed.

Consequently and in summary, although many examples and exemplary embodiments are described above, it will be appreciated that the invention is intended to cover all modifications and equivalents within the scope of the following claims.

What is claimed is:

1. A bottle storing facility for bottles having a flange, comprising a base retainer comprising a series of bottle-receiving bays, each bottle-receiving bay further comprising a substantially semicircular cavity having a first portion of a first diameter, a second portion of a second diameter coaxial to and axially spaced apart from said first portion, and a flange-receiving slot betwixt said first and second portions, with said flange-receiving slot having a contour with an arcuate middle portion betwixt first and second substantially straight end portions, and with said base retainer further comprising at least one upward-facing cavity.

2. The bottle storing facility of claim 1, wherein said base retainer further comprises an exterior surface and a primary drain lumen communicating between said upward-facing cavity and said exterior surface.

3. The bottle storing facility of claim 2, further comprising a tube hydraulically connected to said primary drain lumen.

4. The bottle storing facility of claim 1, wherein said base retainer further comprises at least one secondary drain lumen communicating between said upward-facing cavity and any bay from among said series of bottle-receiving bays.

5. The bottle storing facility of claim 1, further comprising at least one strut having first and second ends and a strut drain lumen extending between said first end and said second end.

6. The bottle storing facility of claim 5, further comprising at least one auxiliary retainer having at least one downward-facing cavity, and with said at least one strut having its first end receivable within said upward-facing cavity of said base and its second end receivable within said downward-facing cavity of said at least one auxiliary retainer, and with said at least one auxiliary retainer comprising at least one bottle-receiving bay further comprising a substantially semicircular cavity having a first portion of a first diameter, a second portion of a second diameter coaxial to and axially spaced apart from said first portion, and a flange-receiving slot betwixt said first and second portions, with said flange-receiving slot having a contour with an arcuate middle portion betwixt first and second substantially straight end portions.

7. The bottle storing facility of claim 6, wherein said at least one auxiliary retainer further comprises a primary drain lumen communicating between said downward-facing cavity and said upward-facing cavity.

8. The bottle storing facility of claim 1, wherein said straight sections of said contour of said slot are substantially parallel to each other.

9. The bottle storing facility of claim 1, wherein said straight end portions of said contour of said flange-receiving slot are substantially parallel to each other.

10. The bottle storing facility of claim 1, wherein said arcuate portion of said contour of said slot defines a diameter, and a point along said first straight portion and a point along said second straight portion define a width dimension narrower than said diameter.

11. The bottle storing facility of claim 1, wherein the number of bays in said base retainer is between two and eight inclusively.

12. The bottle storing facility of claim 6, wherein said first end of said at least one is received within an upward-facing cavity of said base retainer and said second end of said at least one strut is received within a downward-facing cavity of said at least one auxiliary retainer.

13. The bottle storing facility of claim 1, further comprising a material selected from the set of materials consisting of:

a polymer, an epoxy, a natural rubber, a urethane rubber, a nylon, a polyamide, an aliphatic polyamide, a polypropylene, acrylonitrile butadiene styrene, a polyphenylene sulphone, a polyacrylonitrile, a poly methyl methacrylate, a polycarbonate, a glass filled polycarbonate, acetal, a polyoxymethylene, a multi-jet fusion material, a high-density polyethylene, an ultra-high molecular weight polyethylene, a composite material containing a glass fiber, a material having a durometer between 30 Shore A and 80 Shore A inclusively, and a material having a durometer between 35 Shore D and 85 Shore D inclusively.

14. The bottle storing facility of claim 6, further comprising at least one secondary drain lumen communicating between said downward-facing cavity and any bay from among said series of bottle-receiving bays.

15. The bottle storing facility of claim 5, wherein said strut is a lenticular beam having a constant cross section.

16. The bottle storing facility of claim 11, wherein said series of bottle-receiving bays of said base retainer are arranged in a radial symmetry selected from the set of radial symmetries consisting of:

biradial symmetry, three-fold symmetry, four-fold symmetry, five-fold symmetry, six-fold symmetry, seven-fold symmetry, and eight-fold symmetry.

17. The bottle storing facility of claim 6, wherein the number of bays in said auxiliary retainer is between two and eight inclusively.

18. The bottle storing facility of claim 17, wherein said radially spaced apart series of bottle-receiving bays of said auxiliary retainer are arranged in a radial symmetry selected from the set of radial symmetries consisting of:

biradial symmetry, three-fold symmetry, four-fold symmetry, five-fold symmetry, six-fold symmetry, seven-fold symmetry, and eight-fold symmetry.

* * * * *